United States Patent
Zhang et al.

(10) Patent No.: US 10,146,294 B2
(45) Date of Patent: Dec. 4, 2018

(54) METHOD AND NETWORK UNITS FOR HANDLING STATES

(71) Applicant: Telefonaktiebolaget L M Ericsson (publ), Stockholm (SE)

(72) Inventors: Jiangtao Zhang, San Jose, CA (US); Bengt Johansson, Västra Frölunda (SE); Lasse Olsson, Stora Höga (SE); Sten Pettersson, Torslanda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 544 days.

(21) Appl. No.: 14/768,372

(22) PCT Filed: Feb. 18, 2013

(86) PCT No.: PCT/CN2013/071629
§ 371 (c)(1),
(2) Date: Aug. 17, 2015

(87) PCT Pub. No.: WO2014/124556
PCT Pub. Date: Aug. 21, 2014

(65) Prior Publication Data
US 2016/0011648 A1 Jan. 14, 2016

(51) Int. Cl.
*G06F 1/32* (2006.01)
*H04L 12/26* (2006.01)
*H04L 12/12* (2006.01)

(52) U.S. Cl.
CPC ............ *G06F 1/3287* (2013.01); *H04L 12/12* (2013.01); *H04L 43/065* (2013.01);
(Continued)

(58) Field of Classification Search
CPC ..... G06F 1/3206; G06F 1/3209; G06F 1/3287
See application file for complete search history.

(56) References Cited

U.S. PATENT DOCUMENTS 8,681,671 B1 * 3/2014 Hui .................. H04W 52/0225
370/311
2004/0107273 A1 * 6/2004 Biran ................. H04L 67/1029
709/223
(Continued)

FOREIGN PATENT DOCUMENTS

CN 102413554 A 4/2012
WO 2012116467 A1 9/2012

OTHER PUBLICATIONS

International Search Report and Written Opinion issued in corresponding international application No. PCT/CN2013/071629 dated Nov. 28, 2013, 11 pages.

*Primary Examiner* — Zahid Choudhury
(74) *Attorney, Agent, or Firm* — Rothwell, Figg, Ernst & Manbeck, p.c.

(57) ABSTRACT

The embodiments herein relate to a method in a first network unit (101) for handling states in a network (100). The first network unit (101) is adapted to supervise power in the network (100). The first network unit (101) receives a work-load report from one or more of a plurality of second network units (105). The second network units (105) consume power. When the second network units (105) are awake and the workload is below a threshold, the first network unit (101) transmits a sleep request to at least one of the second network units (105) to change from awake to sleep. When the plurality of second network units (105) are asleep and the workload has reached or is above the threshold, the first network unit (101) transmits a wakeup request to at least one of the second network units (105) to change from sleep to awake.

26 Claims, 12 Drawing Sheets

(52) U.S. Cl.
CPC .......... *H04L 43/0817* (2013.01); *H04L 43/16* (2013.01); *Y02D 50/40* (2018.01)

(56) References Cited

U.S. PATENT DOCUMENTS

| | | | | |
|---|---|---|---|---|
| 2011/0107129 | A1* | 5/2011 | Sinykin | G06F 1/3228 713/322 |
| 2011/0264939 | A1* | 10/2011 | Wong | G06F 1/3203 713/323 |
| 2012/0030320 | A1* | 2/2012 | Diab | H04L 12/12 709/220 |
| 2012/0210142 | A1* | 8/2012 | Ichiki | G06F 1/3209 713/300 |
| 2013/0191663 | A1* | 7/2013 | Overcash | G06F 1/3209 713/320 |
| 2014/0258740 | A1* | 9/2014 | Rosenzweig | G06F 1/26 713/300 |

* cited by examiner

METHOD AND NETWORK UNITS FOR HANDLING STATES

CROSS REFERENCE TO RELATED APPLICATION(S)

This application is a 35 U.S.C. § 371 National Phase Entry Application from PCT/CN2013/071629, filed Feb. 18, 2013, designating the United States, the disclosure of which is incorporated herein in its entirety by reference.

TECHNICAL FIELD

Embodiments herein relate generally to a first network unit, a method in the first network unit, a second network unit and a method in the second network unit. More particularly the embodiments herein relate to handling states in a communications network.

BACKGROUND

Methods for improving power consumption in communications networks are getting more and more important for telecommunication operators. Operators do not only care about the capacity of the network nodes, but also the capacity per watt of the network nodes. There are several current power consumption improvement methods which are currently used, and three of them will now be discussed:

One existing method is to improve power consumption of a network node's processor by automatically transitioning the processors hardware components into a lower power state when there is no traffic to the hardware components such that there is no load on the hardware components. This is a processor level power consumption technology. This means if there is no load on the processor's board, the processor will automatically go into low power state. A state may also be referred to as a mode. In a network node, such as for example a Serving General packet radio service Support Node-Mobility Management Entity (SGSN-MME) or an Evolved Packet Gateway (EPG) node, there is always some traffic between boards such as e.g. keep alive messages etc. Such traffic may involve statistics, few subscribers, management, ping-pong alive messages, inter boards' message etc. This type of processor level power consumption technology cannot save much power, since most of the devices are always still alive, i.e. there is always load on the hardware components due to traffic. Therefore, this method is not suitable to improve power consumption.

Another method to improve power consumption is to use a virtualization technology. A virtualization technology may be described as the creation of a virtual rather than actual version of a hardware platform, operating system, storage device, or network resources. Live migration is a process used in a virtualization technology and allows a server administrator to move a running Virtual Machine (VM) or application between different physical machines without disconnecting the client or application. For a successful live migration, the memory, storage and network connectivity of the virtual machine needs to be migrated to the destination. Live migration is supported by some virtualization hypervisors, i.e. a unit that creates and runs virtual machines, such as e.g. a Kernel-based Virtual Machine (KVM). Migrating the running virtual machines to one physical machine is performed when the load is not that high. In a network node, virtualization is seldom used due to performance and latency issues. Even though existing technologies may address these issues, moving existing network nodes to cloud computing is impractical in a near future due to security, network speed, availability, legacy interfaces, CAPital EXpenditure (CAPEX) etc. The cloud computing mentioned above may be described as use of computing resources, i.e. hardware and/or software, which are delivered as a service over a network, e.g. the Internet. The name cloud comes from the use of a cloud shaped symbol as an abstraction for the complex infrastructure it often has in system diagrams.

A further method for improving power consumption is to use a power on/off control strategy. The components of a network node are then dynamically turned on/off based on the load in the components. The components may be also referred to as a board, a blade or a physical machine. However it is very hard to anticipate whether the powered off servers are not needed for some predictable period of time. When the power of several servers is turned on again, the recovery is too long. Hardware initialization, operating system startup, process startup, configuration and taking back the contexts when a server turns on again will take more than three minutes.

SUMMARY

An object of embodiments herein is therefore to obviate at least one of the above disadvantages and to provide improved power consumption in a communications network.

According to a first aspect, the object is achieved by a method in a first network unit for handling states in a communications network. The first network unit is adapted to supervise power in the communications network. The first network unit receives a respective report from one or more of a plurality of second network units. The second network units consume power in the communications network. Each respective report comprises information indicating workload of the one or more of the plurality of second network units in the communications network. When the plurality of second network units are in an awake state and when the workload is below a threshold, the first network unit transmits a sleep request to at least one of the plurality of second network units to change the state from awake to sleep. When the plurality of second network units are in the sleep state and when the workload has reached or is above the threshold, the first network unit transmits a wakeup request to at least one of the plurality of second network units to change the state from sleep to awake.

According to a second aspect, the object is achieved by a method in a second network unit for handling states in the communications network. The second network unit consumes power in the communications network. The second network unit transmits a report to the first network unit. The first network unit is adapted to supervise power in the communications network. The report comprises information indicating workload of the second network unit. When the second network unit is in an awake state and when the workload is below a threshold, the second network unit receives a sleep request from the first network unit to change the state from awake to sleep, and changes the state from awake to sleep based on the sleep request. When the second network unit is in the sleep state and when the workload has reached or is above the threshold, the second network unit receives a wakeup request from the first network unit to change the state from sleep to awake, and changes the state from sleep to awake based on the wakeup request.

According to a third aspect, the object is achieved by the first network unit for handling states in a communications network. The first network unit is adapted to supervise power in the communications network. The first network unit comprises a receiver which is adapted to receive the respective report from one or more of the plurality of second network units. The second network units are adapted to consume power in the communications network. Each respective report comprises information indicating workload of the one or more of the plurality of second network units in the communications network. The first network unit comprises a transmitter which is adapted to transmit the sleep request to at least one of the plurality of second network units to change the state from awake to sleep when the plurality of second network units are in the awake state and when the workload is below the threshold. The transmitter is further adapted to transmit a wakeup request to at least one of the plurality of second network units to change the state from sleep to awake when the plurality of second network units are in the sleep state and when the workload has reached or is above the threshold.

According to a fourth aspect, the object is achieved by the second network unit for handling states in the communications network. The second network unit is adapted to consume power in the communications network. The second network unit comprises a transmitter which is adapted to transmit a report to the first network unit. The first network unit is adapted to supervise power in the communications network. The report comprises information indicating workload of the second network unit. The second network unit comprises a receiver which is adapted to receive a sleep request from the first network unit to change the state from awake to sleep when the second network unit is in an awake state and when the workload is below a threshold. The receiver is further adapted to receive a wakeup request from the first network unit to change the state from sleep to awake when the second network unit is in the sleep state and when the workload has reached or is above the threshold. The second network unit comprises a changing unit which is adapted to change the state from awake to sleep based on the sleep request, and to change the state from sleep to awake based on the wakeup request.

Since the first network node is introduced which is responsible for supervising power consumption the communications network, improved power consumption in the communications network is provided.

Embodiments herein afford many advantages, of which a non-exhaustive list of examples follows:

If a second network unit is under low load or no load at all, there is no need to run the second network unit with full speed and full power. The power consumption of the second network unit should scale with its capacity and performance.

The embodiments herein provides the first network unit for supervising power and which is adapted to improve power consumption in the second network node in a scalable way.

An advantage of the embodiments herein may be that a reduced amount of data traffic is produced and thus less power is needed.

Another advantage of the embodiments herein may be that they enable power scaling with respect to capacity.

Another advantage of the embodiments herein may be that since the first network unit is introduced to supervise power the recovery of the second network units is short when the power is turned on again, after having been in sleep state.

An advantage of the embodiments herein may be that they provide an environmentally friendly solution and that the improved power consumption leads to reduced costs because power is a costly resource.

Another advantage of the embodiments herein may be that they do not have any impact on the network node architecture and functionality.

Furthermore, an advantage of the embodiments herein may be that they may be deployed in a cloud computing environment. If all the network nodes are migrated to a cloud computing environment, the embodiments herein are also applicable. This implies that the first network unit, which determines the change of the states, is a virtual machine in a cloud computing environment. In a non-cloud environment, the first network unit which determines the change of the states is a blade machine or board.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relates to dynamically controlling power consumption by handling states in a communications network 100.

Figure 1:
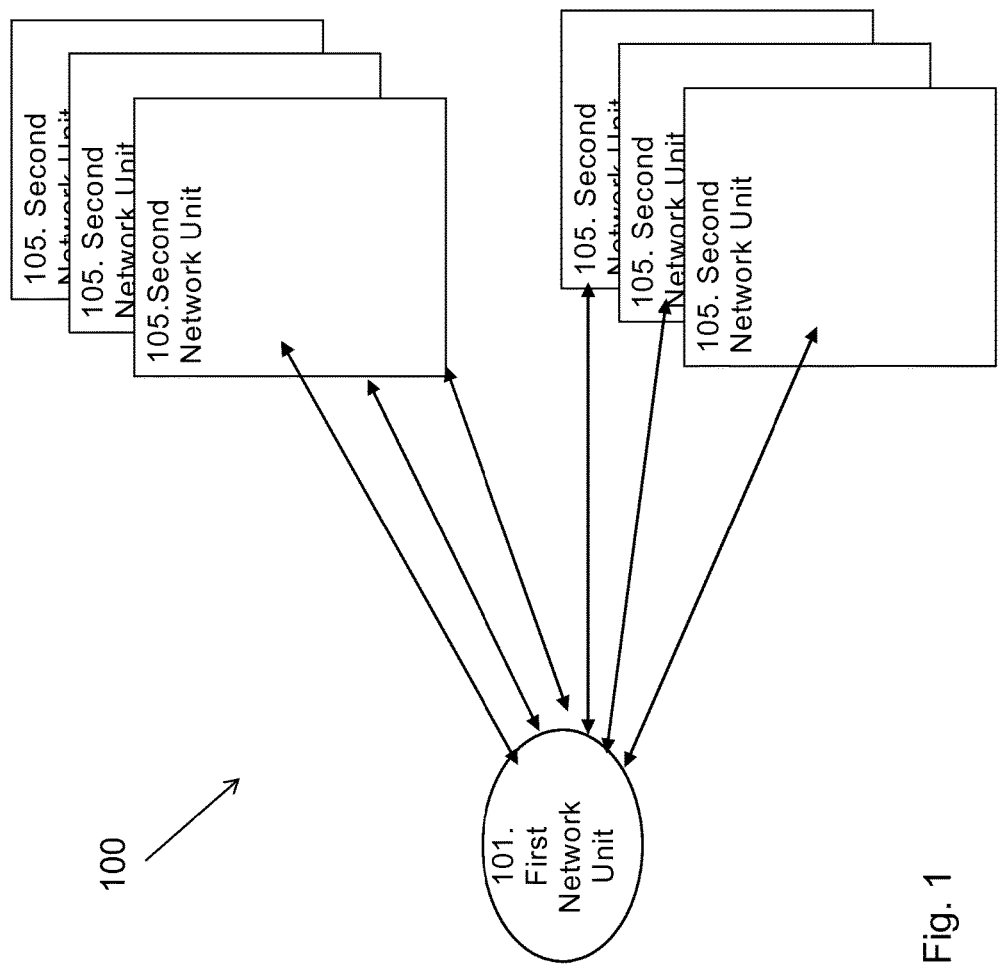
FIG. 1 is a schematic block diagram illustrating embodiments of a communications network.

FIG. 1 depicts a communications network 100 in which embodiments herein may be implemented. The communications network 100 may in some embodiments apply to one or more radio access technologies such as for example Global System for Mobile Communications (GSM), Long Term Evolution (LTE), LTE Advanced, Wideband Code Division Multiple Access (WCDMA), Internet protocol Multimedia Subsystem (IMS), enhanced Multimedia Broadcast Multicast Service (eMBMS), any other Third Generation Partnership Project (3GPP) radio access technology or other radio access technologies such as Wireless Local Area Network (WLAN).

The communications network 100 comprises a first network unit 101 connected to and adapted to dynamically control or supervise the power consumption of one or more of a plurality of second network units 105. The first network unit 101 may also be referred to as a power supervision unit and the second network unit 105 may be referred to as a power consumption unit. The first network unit 101 reduces power consumption in a scalable way. The first network unit 101 may be represented by an active control board together with a passive control board for the sake of redundancy. The first network unit 105 may be located in a SGSN-MME or a Mobile Switching Center (MSC), it may be a standalone pair of servers or a VM in a cloud etc. MSC is a node with communications switching functions, such as e.g. call setup, release and routing. It is also responsible for routing e.g. voice calls and Short Message Service (SMS) as well as other services from one network path to another.

The second network unit 105 may be represented by a blade, server or board, and it may be located in SGSN-MME, a virtual machine in a virtualized environment, such as a cloud etc. These examples will be described in more detail below.

The example communications network 100 may further include any additional elements, units and nodes suitable to support communication between the first network unit 101 and the second network unit 105. The illustrated first network unit 101 and the second network unit 105 may represent units that comprise any suitable combinations of hardware and/or software.

The embodiments herein relate to dynamically controlling the power consumption in a communications network 100 by using the first network unit 101. Messages such as setup request, setup response, sleep request, sleep response, wakeup request, wakeup response, workload request and workload report may be used by the first network unit 101 to support general purpose power supervision. The first network unit 101 also provides a way to fetch the statistics of a whole node, such as how many second network units 105 in the node that are in sleep state, how long a second network unit 105 has been in the sleep state, etc.

Session resilience (SR) may be supported in the second network unit 105. Session resilience is a procedure to move data from a second network unit 105 that will go into sleep state to another second network unit 105 that will stay awake. The data may be a subscriber online bearer context, a link state table, data in a memory database, board index etc. In a cloud computing environment, session resilience may be a live migration procedure, which makes the embodiments herein easily deployed in a cloud environment.

Certain capacity may be reserved by the first network unit 101 for an incoming workload, e.g. a sudden incoming workload. Quality of Service (QoS) provided by the first network unit 101 may be taken into consideration when setting the second network unit 101 in sleep state or awake state. The first network unit 101 may base its decision to using the sleep state or awake state on different parameters for different systems and applications. Furthermore, fluctuation by constantly take some second network units 105 out of service, and setting other second network units 105 into service may be avoided when determining the sleep state or awake state.

Figure 2:
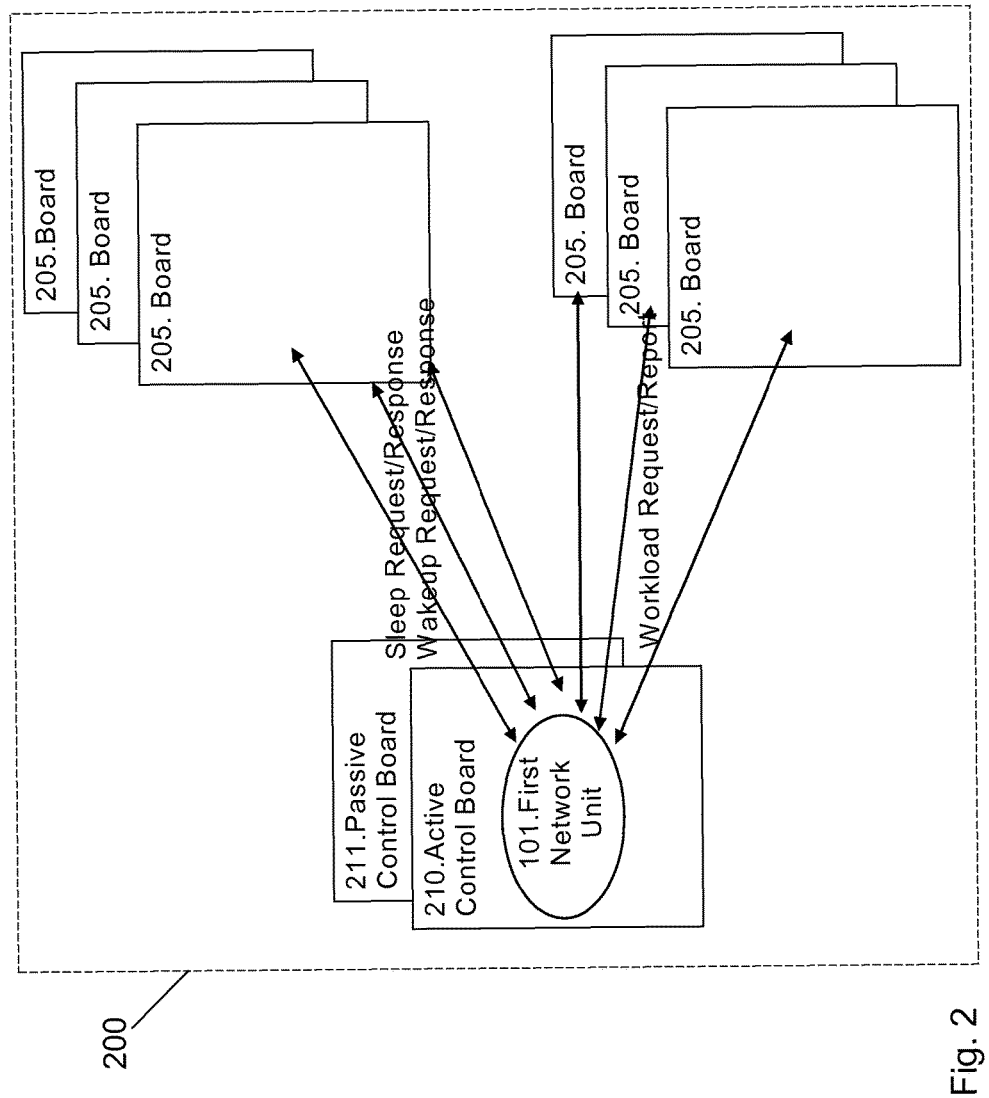
FIG. 2 is a schematic block diagram illustrating embodiments of a communications network.

In some embodiments, the first network unit 101 and the second network units 105 are co-located in one network node 200 as illustrated with the dotted square in FIG. 2. Such network node 200 may be for example a SGSN-MME, a Serving GateWay (SGW), a Packet data network GateWay (PGW), a Policy and Charging Rules Function (PCRF), a Call Session Control Function (CSCF) if the communications network 100 is an IMS network etc. The network node 200 comprises a combination of hardware, software, and firmware. A physical implementation of the network node 200 may comprise a plurality of modules, cards, boards, blades, etc. adapted to interface with the chassis, frame, shelf etc. of the network node. For example, a board may comprise components such as processors, memory, and network connections. In FIG. 2, the first network unit 101 is exemplified to be located in an active control board 210 of the network node 200. The network node 200 may further comprise a passive control board 211. The active control board 210 is a serving board of the first network unit 101. The passive control board 211 is a standby board. When the active control board 210 is down due to some error, the passive control board 211 may take over the function of the active control board 210. The active control board 210 and the passive control board 211 may be seen as being a master and a slave and providing redundancy. Each of the second network units 105 are represented by a respective board 205 in the network node 200 in FIG. 2. Each board 205 may be for example a blade. The active control board 210, the passive control board 211 and the boards 205 may be of the same hardware type and based on the same operating system, but they may have different software. The first network unit 101 and the second network units 105 may transmit at least one of sleep request and sleep response messages, wakeup request and wakeup response and workload request and workload report between them. These messages will be described in more detail below.

Figure 3:
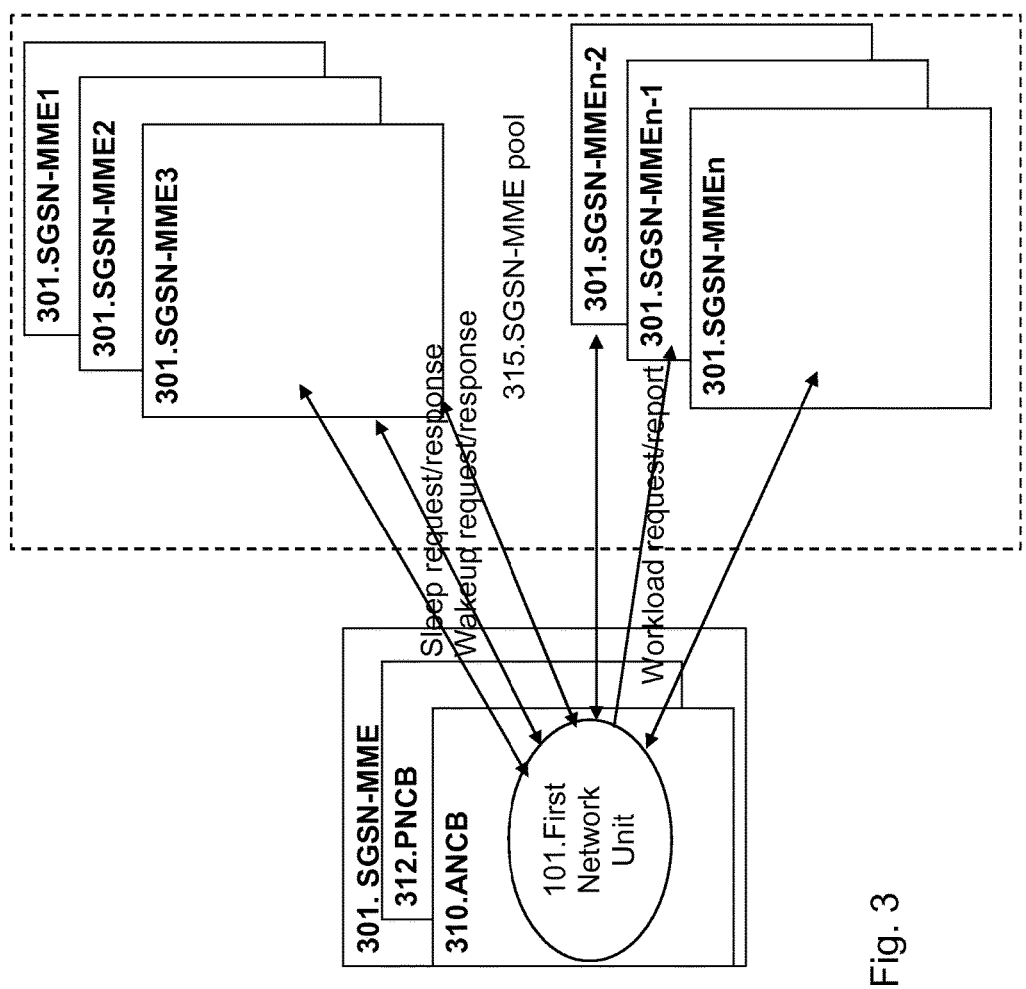
FIG. 3 is a schematic block diagram illustrating embodiments of a communications network.

In some embodiments, the first network unit 101 and the second network units 105 are located in different network nodes, e.g. SGSN-MMEs, as seen in FIG. 3. The first network unit 101 may be located in one network node, and the second network units 105 are each located in other network nodes. For example, the first network unit 101 may be located in a SGSN-MME 301, for example in an Active Node Control Board (ANCB) 310 of the SGSN-MME 301. The SGSN-MME 301 in which the first network unit 101 may be located may also comprise a Passive Network Control Board (PNCB) 312. Each of the second network nodes 105 is exemplified in FIG. 3 to be located in a respective SGSN-MME 301, different from the SGSN-MME in which the first network unit 101 is located. FIG. 3 is exemplified with SGSN-MME 1 , SGSN-MME 2 , SGSN-MME 3 , SGSN-MME n-1, SGSN-MME n-2 and SGSN-MME n, where n is a positive integer. However, the skilled person will understand that there may be any suitable number of SGSN-MMEs 301 different from the number exemplified in FIG. 3. The SGSN-MMEs 301 in which the second network units 105 are located are illustrated in FIG. 3 to be located in a SGSN-MME pool 315, represented by the dotted box. Similar to FIG. 2, messages such as setup request, setup response, sleep request, sleep response, wakeup request, wakeup response, workload request and workload report are used in FIG. 3 to enable the first network unit 101 to perform power consumption control. The messages will be described in more detail below. The SGSN-MME 301 mentioned above is a network node comprising both SGSN functions and MME functions. The SGSN functions are for example to handle packet switched data in the network 100, to be a service access point to the communications network 100 for wireless devices, to perform authentication etc. The MME functions are for example to perform bearer activation/deactivation, to choose a SGW for a wireless device, authentication, provide control plane function for mobility between LTE and second generation and/or third generation (2G/3G) access networks. The SGSN-MME pool 315 allows centralization and grouping of SGSN-MME nodes.

In another embodiment, the first network unit 101 is located in a MSC and each second network units 105 are located in a respective MSC in a MSC pool. As mentioned above, the MSC is a node with communications switching functions, such as e.g. call set-up, release and routing. It is also responsible for routing e.g. voice calls and SMS as well as other services from one network path to another.

Figure 4:
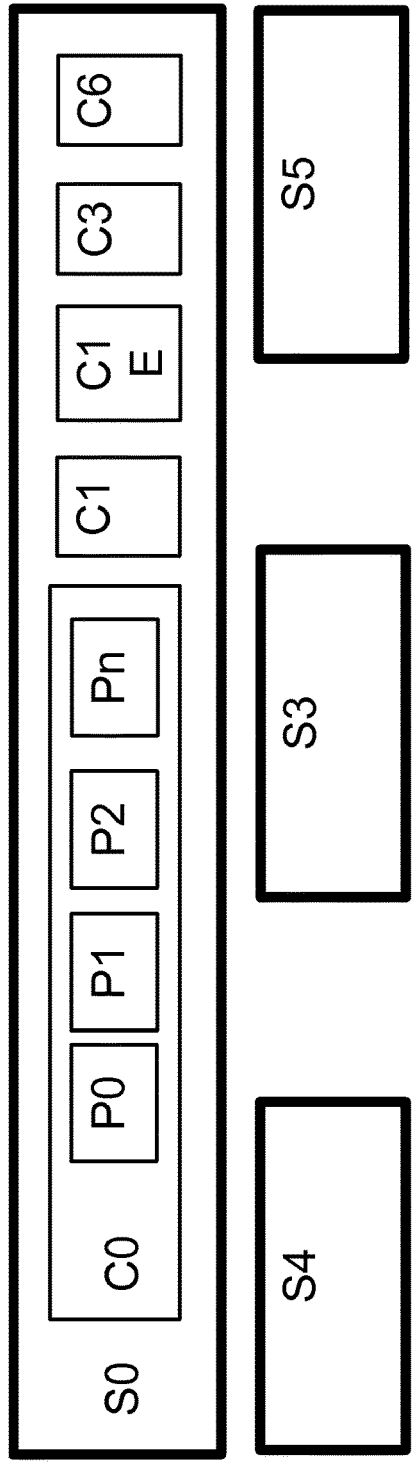
FIG. 4 is a schematic block diagram illustrating power states.

The overall power consumption for the second network unit 105 may be referred to using different power states and will now be described with reference to FIG. 4. There are three main power states: S-State, C-State and P-State:

S-State: S-State is a System Sleeping Power State which allows the whole system, i.e. the whole second network unit 105, to save power by suspending the system to a Random Access Memory (RAM) or a disk. The S-State may comprise the sub states S0, S3, S4 and S5. S0 corresponds to power on and full operation and S5 corresponds to complete power off. The states S3 and S4 may be referred to as sleeping states and are states where the second network unit 105 appears to be off because of low power consumption and the second network unit 105 retains enough of the hardware context to return to the working state without a reboot. S3 or S4 may be used for the sleep state in the embodiments herein. In order to get a better recovery speed, S3 may be used instead of S4. When the second network unit 105 is in the S4 state, it consumes less power than in the S3 state. The processor and hardware context, cache contents, and chipset context are lost in state S3, but the second network unit 105 memory is retained. In the S4 state, the second network unit 105 consumes the least power compared to all other sleep states. The second network unit 105 is almost at an OFF state, expect for a trickle power, when in S4 state. The context data is written to hard drive disk and there is no context retained when the second network unit 105 is in state S4. The S3 state may also referred to as standby, sleep or suspend to RAM. The S4 state may be also referred to as suspend to disk. The S5 state may also be referred to as soft off.

C-State: C-State is a Processor Power State which reduces power by setting a processor comprised in the second network unit 105 in sleep state when it has no code to execute. The C-State may comprise the sub states C0, C1, C1 E, C3 and C 6. The C-states may be sub states of S0, as seen in FIG. 4. C0 is the operating state. C1 and C1 E are halt states. C3 is a state where the processor of the second network unit 105 is in sleep state. State C6 is a deep processor sleep state.

P-State: P-State is a Performance Power State which reduces power without preventing the processor of the second network unit 105 from executing code. The P-State may comprise the sub states P0, P1, P2 and Pn. The P-States may be sub states of C0, as seen in FIG. 4. In P0 state, the performance of the processor of the second network unit 105 is at maximum. Pn refers to less power and less performance.

Not all the hardware components of the second network unit 105 may support the above three power states, S, P and C, but most of the hardware components of the second network unit 105 support a sleep state such as S3 or S4. The sleep state may also be referred to as a hibernation state.

The C and P states may be described as processor level power consumption techniques. However, the S state is a system level power consumption technique. Table 1 below shows numerical examples for the different states for an example processor based server. The left most column comprises the states P1, C3, C6, C7, S3 and S4. The middle columns comprise information indicating the power consumption of the processor and the wakeup time for each state. The right most column comprises information indicating the performance of the processor for each state.

TABLE 1

| Example processor based server | | | |
|---|---|---|---|
| State | Power consumption | Wakeup time | Performance |
| P1 | High (95 W) | 0 | High |
| C3, C6, C7 | Middle(50 W) | 0 | Middle |
| S3 | Low(5-10 W) | 1 s | N/A |
| S4 | Lowest(1-3 W) | 10-15 s | N/A |

The N/A, short for Not Applicable, for the performance of the S3 and S4 state means that there is not any performance for those states. This is because in S3, only the memory chip of the second network unit 105 is powered on, and in S4, there is only a trickle power on the Local Area Network (LAN) for the second network unit 105. No computing resources are available at S3 and S4.

The method for for dynamically controlling power consumption in the communications network 100 according to some embodiments will now be described with reference to the signalling diagrams in FIGS. 5-8. Only one second network unit 105 is shown for the sake of simplicity in FIGS. 5-8. However, the method is equally applicable to an embodiment comprising a plurality of second network units 105.

Setup Procedure

Figure 5:
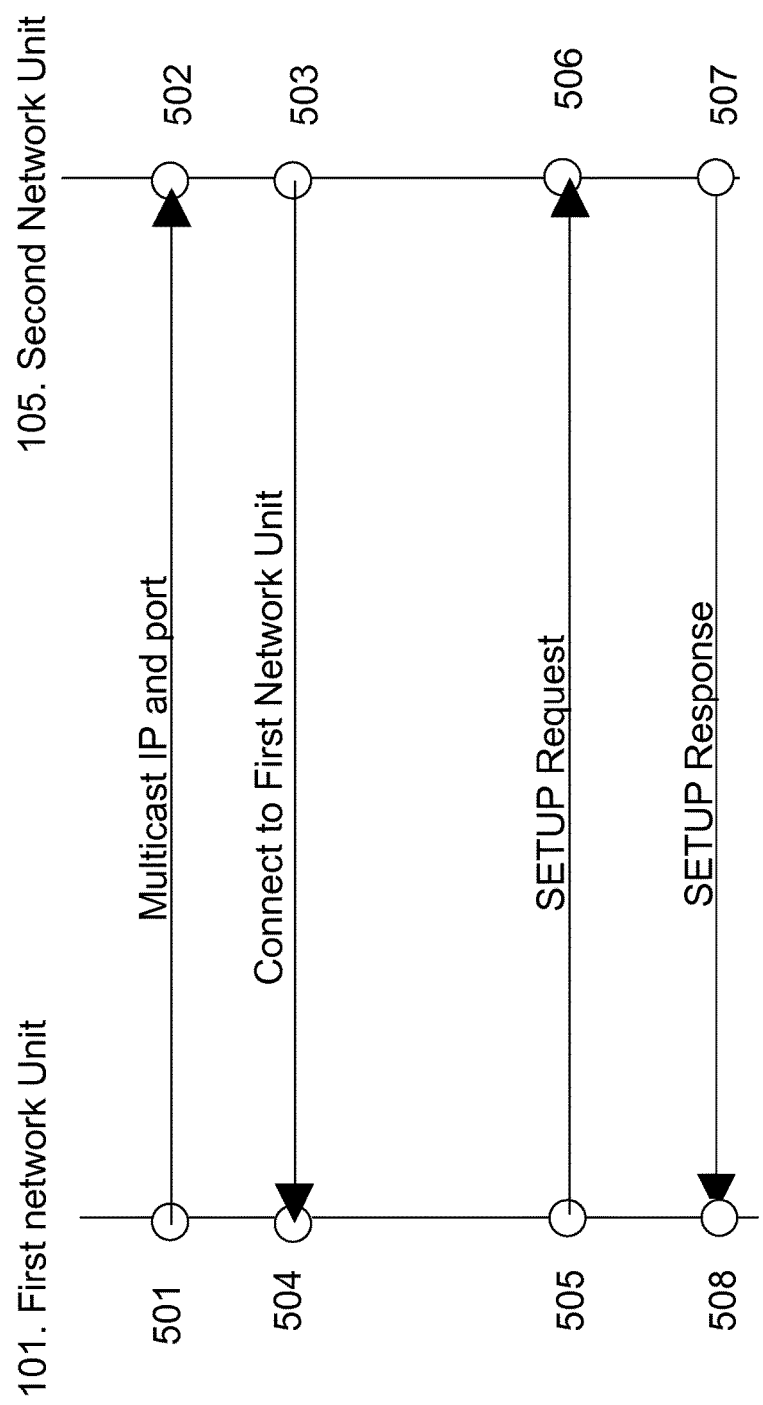
FIG. 5 is a signaling diagram illustrating embodiments of a setup procedure.

FIG. 5 is a signaling diagram illustrating a setup procedure for setting up a connection between the first network unit 101 and the second network unit 105. The method comprises the following steps, which steps may be performed in any suitable order:

Step 501

The first network unit 101 multicasts information indicating its control Internet Protocol (IP) address and port number needed by the second network unit 105 in order to be connected to the second network unit 105.

Step 502

The second network unit 105 joins the multicast, and receives the information indicating the IP address and port number from the first network unit 101. This information enables the second network unit 105 to be connected to the first network unit 101.

Step 503

When the second network unit 105 has joined the multicast and received the multicast IP address and port number from the first network unit 101 it connects to the first network unit 101 by using the received IP address as a destination IP address and the received port number as a destination port number. The second network unit 105 transmits a connect request to the first network unit 101.

Step 504

The first network unit 101 receives and accepts the connect request from the second network unit 105. Thus, the first network unit 101 and the second network unit 105 have been successfully connected.

Step 505

When the first network unit 101 has successfully been connected to the second network unit 105, the first network unit 101 transmits a setup request to the second network unit 105 to setup the connection between the first network unit 101 and the second network unit 105. The setup request comprises configuration parameters. In some embodiments, the setup request comprises information indicating a time interval for transmitting a workload report to the first network unit 101. The workload report will be described in more detail with reference to FIG. 6 below.

Step 506

The second network unit 105 receives the setup request from the first network unit 101, configures the connection between the first network unit 101 and the second network unit 105 based on the configuration parameters. In some embodiments, when the second network unit 105 is for example a blade, it may be an agent or an application on the blade that receives the setup request.

Step 507

When the configuration is done, the second network unit 105 may transmit a setup response to the first network unit 101 indicating that the setup request was successfully received and that it is ready to communicate with the first network unit 101.

Step 508

The first network unit 101 receives the setup response transmitted by the second network unit 105 in step 507. The setup response is used to indicate that the second network unit 105 will be under power supervision by the first network unit 101. The setup response may comprise a Media Access Control (MAC) address of the second network unit 105. The MAC address is a hardware address that uniquely identifies each node of a network and may be used to generate a magic packet, as described in step 801 below.

Note that the setup procedure illustrated in FIG. 5 is only an example and that any other suitable setup procedure may be used. For example, the second network unit 105 may have a predefined IP address and port number which is used when connecting to the first network unit 101. Thus, the multicast procedure described above is optional.

Workload

Figure 6:
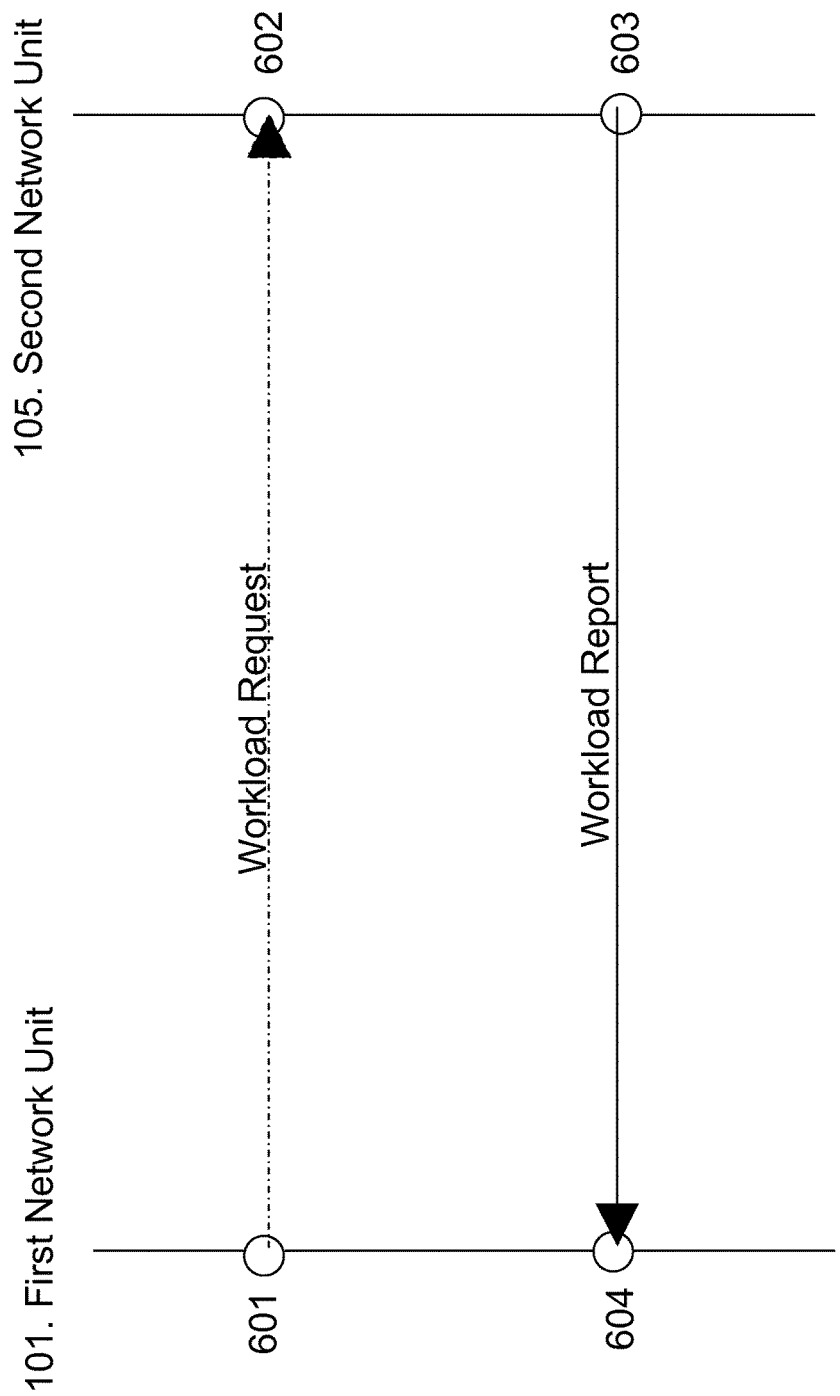
FIG. 6 is a signaling diagram illustrating embodiments of a workload procedure.

FIG. 6 is a signaling diagram illustrating a request and report procedure for the first network unit 101 to obtain information regarding the workload of the second network unit 105. The method comprises the following steps, which steps may be performed in any suitable order:

Step 601

In some embodiments, the first network unit 101 transmits a workload request to the second network unit 105 to obtain information indicating the workload of the second network unit 105. In some embodiments, the workload request may be in the form of a workload query.

Step 602

In some embodiments, the second network unit 105 receives the workload request. This step also involves that the second network unit 105 obtains information indicating its workload. The workload may be a current workload, an average workload for a pervious time period, the memory capacity and computing resources statistics associated with the second network unit etc. The workload is not a predicted workload for a future time period.

The arrow between steps 601 and step 602 is indicated with a dotted line in FIG. 6 to illustrate that they are optional steps, i.e. the workload request is optional.

Step 603

The second network unit 105 reports its workload to the first network unit 101. In some embodiments, the second network unit 105 reports its workload after receiving the workload request in steps 601 and 602. In some embodiments, the second network unit 105 reports its workload regularly with a specified time interval to the first network unit 101. The time interval may be default or it may be configured via the setup procedure in FIG. 5 or it may notified by the first network unit 101 in the workload request message. The second network unit 105 reports its workload when the second network unit 105 has been connected to the first network unit 101, e.g. via the agent or application on a blade. The workload report may comprise information indicating the current workload, an average workload for a pervious time period, the memory capacity and computing resources statistics associated with the second network unit etc. In the embodiment where the second network unit 105 receives a workload request, the second network unit 105 may immediately report its workload to the first network unit 101 after having received the request.

Step 604

The first network unit 101 receives the workload report. As mentioned above, the workload report may comprise information indicating the current workload, an average workload for a pervious time period, the memory capacity and computing resources statistics associated with the second network unit etc. The memory capacity may be the free amount of memory or the total amount of memory. The memory and Central Processing Unit (CPU) usage is used by the first network unit 101 to calculate the processor capacity and memory capacity of the second network unit 105, to determine the number of second network units 105 that should go to sleep, the number of second network units 105 that should stay awake, how long a second network unit 105 has been in sleep state etc. In the embodiment shown in FIG. 2 where the first network unit 101 and the second network unit 105 are co-located in the same network node 200, the first network unit 101 obtains statistics of the whole network node 200. In the embodiments shown in FIG. 3 where the first network unit 101 and the second network unit 105 are located in separate nodes, the first network unit 101 obtains statistics of the whole pool 315.

The workload request and the workload report may be seen as ping-pong keep alive message between the second network unit 105 and the first network unit 101. A keep alive message is a message sent by one device to another to check that the connection between the two is operating, or to prevent this connection from being broken. The keep alive message may be sent as a ping-pong message.

Going to Sleep

Figure 7:
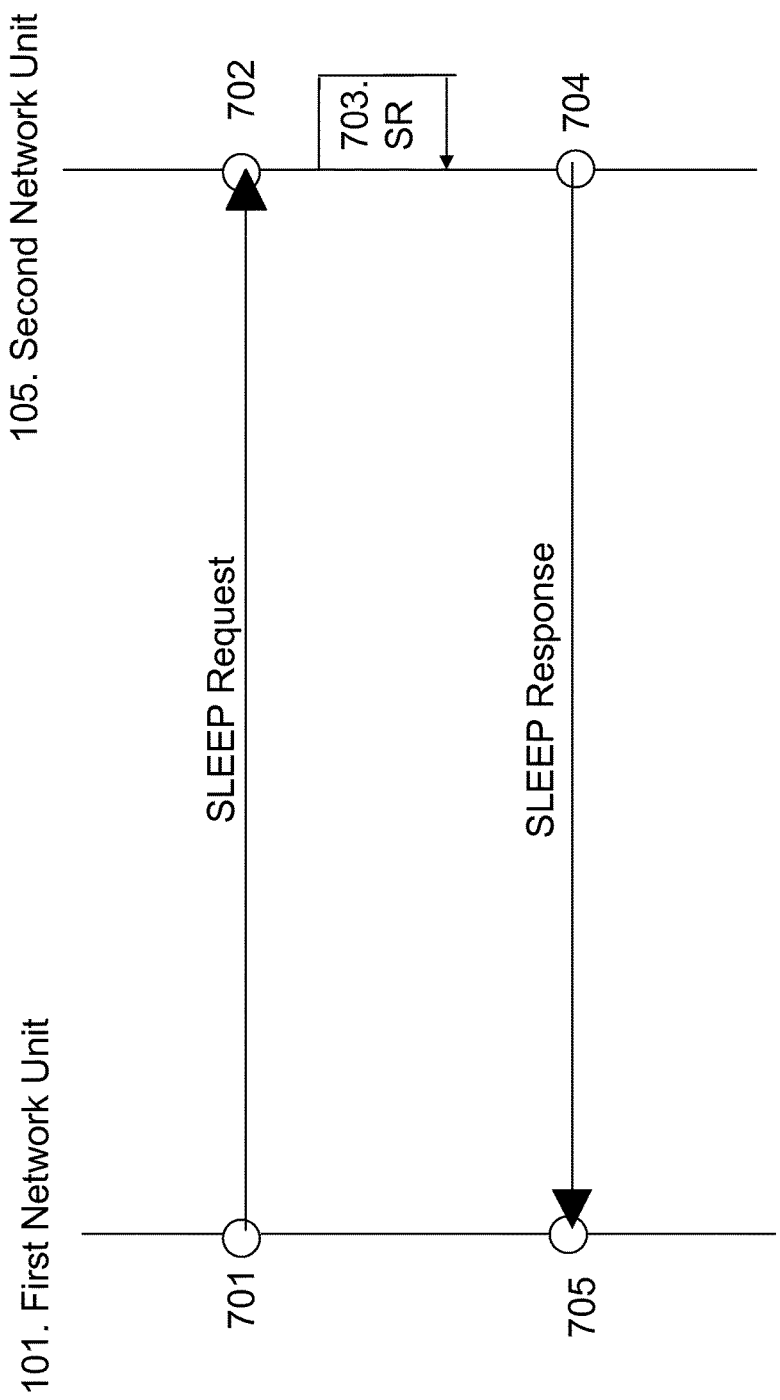
FIG. 7 is a signaling diagram illustrating embodiments of a sleep procedure.

FIG. 7 is a signaling diagram illustrating a procedure for the second network unit 105 to enter the sleep state. The second network unit 105 is in the awake state at start of this procedure. The method comprises the following steps, which steps may be performed in any suitable order:

Step 701

When the first network unit 101 has received the workload report from the second network unit 105 in FIG. 6, it determines whether the workload is below a threshold or whether the workload has reached or is above the threshold. When the workload is below the threshold, the workload may be seen as being at a low level. When the workload reaches or is above the threshold, the workload may be seen as being at a high level. When the workload is below the threshold, the first network unit 101 transmits a sleep request to the second network unit 105. The sleep request may also be referred to as a hibernation request or a suspend request.

The sleep state is not the same as turning off the power of the second network unit 105. The sleep state it is a kind of sleep or deep sleep state. When in sleep state, all the running contexts associated with the second network unit 105 will be saved in a RAM or a disk of the first network unit 101. In some embodiments, the disk may be located in a file server in the network node 200 in which the first network unit 101 is located.

Step 702

The second network unit 105 receives the sleep request message. The sleep request may comprise information indicating a time when the second network unit 105 should enter the sleep state. The sleep request message may comprise information indicating that the request should be handled with a low or lowest priority by the second network unit 105.

Step 703

In some embodiments, once the second network unit 105 receives the sleep request message, it may originate the session resilience procedure to transfer all the living service information and service data to another second network unit 105, which is not going to sleep. The session resilience may be implemented in different ways depending on the architecture of the network node in which the second network unit 105 is located.

As mentioned earlier, the session resilience is a procedure for moving the necessary data from one second network unit 105 to another. The data may be the subscriber online bearer context, a link state table, data in a memory database, a board index etc. In a cloud computing environment, session resilience may be the live migration procedure. Thus, the embodiments herein may be easily deployed in a cloud environment.

Step 704

The second network unit 105 transmits a sleep response message to the first network unit 101. The sleep response may be transmitted immediately after the session resilience is finished or after the sleep request is received. After transmitting the sleep response or after finishing the session resilience procedure, the second network unit 105 will change its state from awake to sleep. In some embodiments, entering sleep state involves calling a native power management interface in the second network unit 105 to sleep state according to parameters in the sleep request.

Step 705

The first network unit 101 receives the sleep response from the second network unit 105 and records information about the sleep state of the second network unit 105 for example in a memory unit.

Wakeup

Figure 8:
FIG. 8 is a signaling diagram illustrating embodiments of a wakeup procedure.

FIG. 8 is a signaling diagram illustrating a procedure for the second network unit 105 to enter the wakeup state. The second network unit 101 is in the sleep state at start of this procedure. The method comprises the following steps, which steps may be performed in any suitable order:

Step 801

When the first network unit 101 has received the workload report from the second network unit 105 in FIG. 6, it determines whether the workload is below a threshold or whether the workload has reached or is above the threshold. The first network unit 101 sends a wakeup request message to the second network unit 105 once the workload of the whole second network unit 105 is increasing, e.g. when the workload is on or above the threshold. The wakeup request message may be implemented based on the WAKE on LAN (WOL) technology. WAKE on LAN is an Ethernet standard to allow the second network unit 105 to be powered on or awaked from standby or sleep state by using a "magic packet". In order to support the WOL, the Basic Input-Output System (BIOS) of the second network unit 105 shall be configured.

The wakeup request message may comprise information indicating that the wakeup request shall be handled with high or highest priority by the second network unit 105.

Step 802

The second network unit 105 receives the wakeup request from the first network unit 101. When the network adapter of the second network unit 105 receives the "magic packet" created for its unique MAC address in the communications network 100 transmitted from the first network unit 101 in step 801, the second network unit 105 recovers from the sleep state, RAM or disk, and goes back to normal procedure, i.e. it enters awake state.

The second network unit 105 may handle the wakeup request message with high or the highest priority.

Step 803

The second network unit 105 executes the session resilience procedure in order to get back a certain workload from the other second network unit 105 once the recovery is done, i.e. once the second network unit 105 has entered the awake state.

Step 804

When the second network unit 105 has executed the session resilience procedure, it transmits a wakeup response message to the first network unit 101. The wakeup response may be transmitted immediately after the session resilience is finished or after the awake request is received. After transmitting the awake response or after executing the session resilience procedure in step 803, the second network unit 105 will change its state from sleep to awake. A sleep is in the direction from an upper layer to a lower layer. A wakeup is in the direction from the lower layer to the upper layer.

Step 805

The first network unit 101 receives the wakeup response from the second network unit 105 and records information about the awake state of the second network unit 105 for example in a memory unit.

Exceptional Case

If the connection between the first network unit 101 and the second network unit 105 is lost or broken or closed, all the history information stored on the first network unit 101 for this second network unit 105 will get invalid, i.e. information relating to when the second network unit 105 has previously been in sleep state, how long these sleep states has been etc.

If the first network unit 101 has not received any setup response and/or sleep response and/or wakeup response and/or workload report from the second network unit 105, the first network unit 101 may repeat the request procedure, i.e. the setup request and/or the sleep request and/or the wakeup request and/or workload request.

In some embodiments, if the second network unit 105 receives a duplicate request from the first network unit 101, the second network unit 105 may regard the duplicate request as a new request. The request is the setup request and/or sleep request and/or awake request and/or workload request.

In some embodiments, if the first network unit 101 receives duplicate response from a second network unit 105, the first network unit 101 may silently ignore the duplicate response. The response may be the setup response and/or sleep response and/or wakeup response and/or workload report.

In some embodiments, if the first network unit 101 has not received any sleep response and workload report from the second network unit 105, the second network unit 105 may be regarded as already into sleep state.

In order for the first network unit 101 to determine that the second network unit 105 should be in sleep state or awake state, it uses the workload report seen in FIG. 5. The workload report may comprise information indicating the CPU resource of the second network unit 105 and its multicore capability. The first network unit 101 uses the system cost memory in order to calculate the capacity.

The first network unit 101 may calculate the average computing cost associated with all the second network units 105 on the core level, or on the CPU level. If the average cost is below a threshold H the first network unit 105 determines whether some of the second network units 105 in the communications network 100 needs to enter sleep state. The threshold H may be in percentage and may be for example 70% or 80%. The threshold may be predefined.

In some embodiments, the threshold H % may be a range instead of a single point in order to avoid fluctuation.

The first network unit 101 may use the following formula when computing the average CPU level:

$$CPU_{average} = \frac{(C_{1-1} + C_{1-2} + \ldots + C_{1-m1})/m1}{N} + \frac{(C_{2-1} + C_{2-2} + \ldots + C_{2-m2})/m2}{N} + \ldots + \frac{(C_{n-1} + C_{n-2} + \ldots C_{n-m3})/m3}{N} \quad (1)$$

N is the number of second network units 105 controlled by the first network unit 101.

M is the core numbers on each second network unit 105, and M may be different for different second network units 105.

In order to determine how many second network units 105 that needs to enter sleep state, the first network unit 101 may use the following equation:

$$Second\_network\_units\_need\_sleep = N - \frac{N \times CPU_{average}}{H \%} \quad (2)$$

Using an example where the number of second network units 105 controlled by the first network unit 101 is N=8, the $CPU_{average}$=23.3% and the H %=80%. When using equation (2) the number of second network units 105 that needs to be in sleep state is 5. Thus, the number of second network units that should be in awake state is 3.

The first network unit 101 may use different principles when determining whether the second network unit 105 should be in sleep state or awake state. For example, at least two second network units 105 needs to be in awake state in the communications network 100 for the sake of redundancy. The floor of the equation (2) for computing which second network units that needs to be in sleep state should be used, instead of the ceiling. The memory of the second network units 105 may also be calculated for ensuring enough space for the migrated subscribers. The first network unit 101 may not put the same second network unit 105 into sleep state all the time.

Summarized, the first network unit 101 will regularly collect information indicating the memory and computing resource from all the second network units 105 in the communications network 100, or reported by the second network units 105 by themselves. When the first network unit 101 detects that the workload in the communications network 100 is low, it shall determine to take certain second network units 105 out of service by putting then into a sleep state. The embodiments herein use a system sleep state to save power instead of processor level sleep state. A processor level power consumption technology cannot save much power even since most of the devices are still alive. The system level power consumption technology according to the embodiments herein saves much of the power since only the RAM or the LAN adapters of the second network units 105 are in operation.

This way, it does not take long time to get the second network units 105 back into service when the load is increasing. Before taking certain second network units 105 out of service, a session resilience mechanism may be implemented on the second network units 105 to migrate some online serving data from one second network units 105 to another in advance in order for service continuation.

Figure 9:
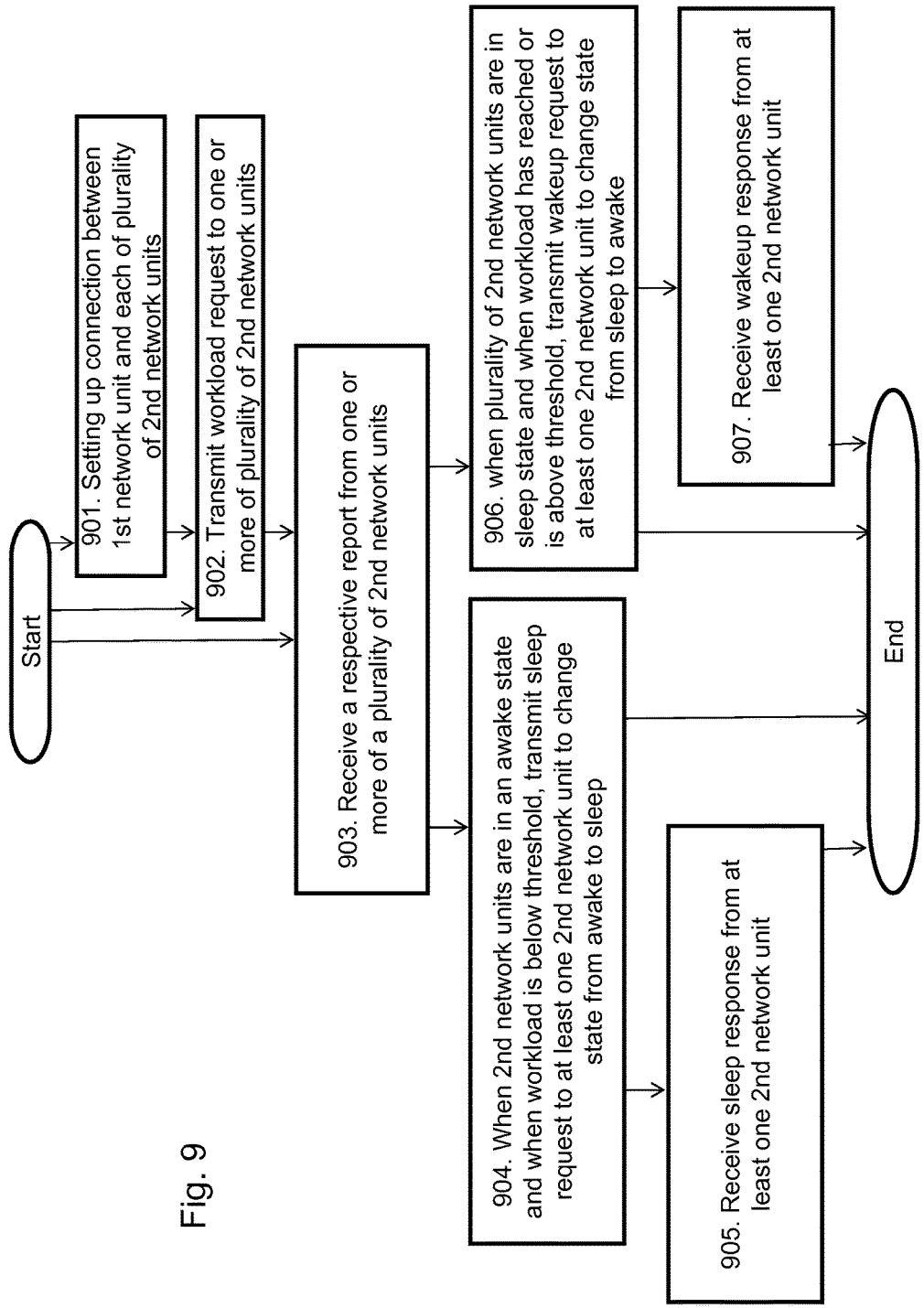
FIG. 9 is a flow chart illustrating embodiments of a method in a first network unit.

The method described above will now be described seen from the perspective of the first network unit 101. FIG. 9 is a flowchart describing the present method in the first network unit 101 for handling states in the communications network 100. As mentioned above, the first network unit 101 is adapted to supervise power in the communications network 100. In some embodiments, the first network unit 101 and the second network units 105 are co-located in one network node. In some embodiments, the first network unit 101 is located in one network node and each of the second network units 105 are located in respective other network nodes. The second network units 105 may be virtual machines in a virtualized environment. The method comprises the following steps performed by the first network unit 101 and which steps may be performed in any suitable order:

Step 901

This step corresponds to steps 501, 504, 505, 508 in FIG. 5. In some embodiments, the first network unit 101 sets up a connection between the first network unit 101 and each of the plurality of second network units 105.

Step 902

This step corresponds to step 601 in FIG. 6. In some embodiments, the first network unit 101 transmits a workload request to one or more, or all, of the plurality of second network units 105.

Step 903

This step corresponds to step 604 in FIG. 6. The first network unit 101 receives a respective report from one or more of the plurality of second network units 105. The second network units 105 consume power in the communications network 100. Each respective report comprises information indicating the workload of the one or more of the plurality of second network units 105 in the communications network 100. The report may be received as a response to the workload request in step 902. The workload report may be received regularly.

The information indicating workload may comprise information indicating at least one of memory capacity of the one or more of the plurality of second network units 105 and computing resources of the one or more of the plurality of second network units 105 and a duration of sleep state of the one or more of the plurality of second network units 105 and quality of service associated with the one or more of the plurality of second network units 105.

Step 904

This step corresponds to step 701 in FIG. 7. When one or more of the plurality of second network units 105 are in an awake state and when the workload is below a threshold, the first network unit 101 transmits a sleep request to at least one of the one or more of the plurality of second network units 105 to change the state from awake to sleep.

In some embodiments, the sleep request comprises information indicating a time at which the change of state shall occur and a duration of the sleep state. In some embodiments, the sleep request comprises information indicating that the at least one of the one or more of the plurality of second network units 105 should handle the sleep request with a low priority. In some embodiments, the sleep request is transmitted to the at least one of the one or more of the plurality of second network units 105 taking into account a future incoming workload to one or more of the plurality of second network units 105.

Step 905

This step corresponds to step 705 in FIG. 7. In some embodiments, the first network unit 101 receives a sleep response from the at least one of the one or more of the plurality of second network units 105. The response comprises information indicating that the state has been changed from awake to sleep.

Step 906

This step corresponds to step 801 in FIG. 8. When one or more of the plurality of second network units 105 are in the sleep state and when the workload has reached or is above the threshold, the first network unit transmits a wakeup request to at least one of the one or more of the plurality of second network units 105 to change the state from sleep to awake. In some embodiments, the wakeup request comprises information indicating that the at least one of the one or more of the plurality of second network units 105 should handle the wakeup request with a high priority.

Step 907

This step corresponds to step 805 in FIG. 8. In some embodiments, the first network unit 101 receives a wakeup response from the at least one of the one or more of the plurality of second network units 105 comprising information indicating that it has changed the state from sleep to awake.

Figure 10:
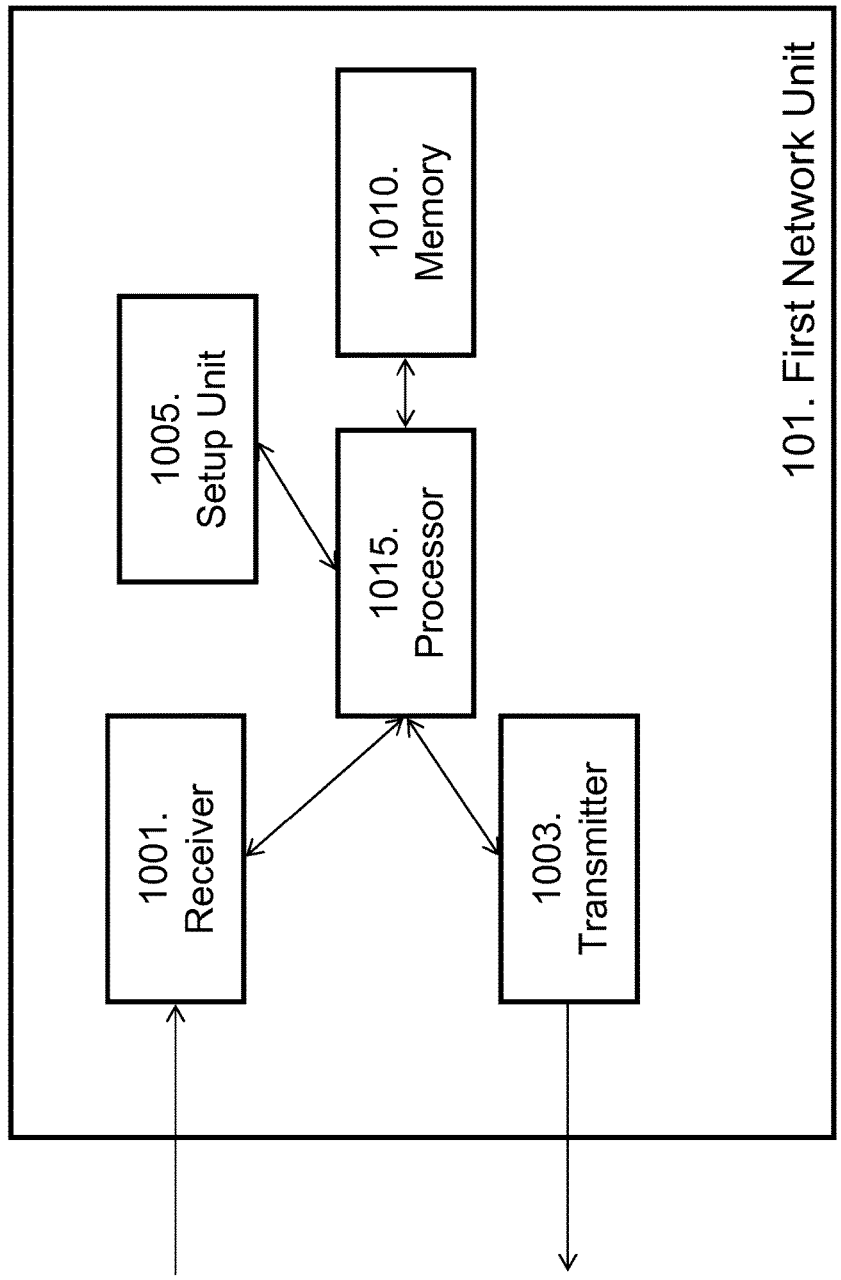
FIG. 10 is a schematic block diagram illustrating embodiments of the first network unit.

To perform the method steps shown in FIG. 9 the first network unit 101 comprises an arrangement as shown in FIG. 10. As mentioned above, the first network unit 101 is adapted to supervise power in the communications network 100. In some embodiments, the first network unit 101 and the second network units 105 are co-located in one network node. In some embodiments, the first network unit 101 is located in one network node and each of the second network units 105 are located in respective other network nodes.

In some embodiments, the second network units 105 are virtual machines in a virtualized environment.

The first network unit 101 comprises a receiver 1001 adapted to receive a respective report from one or more of the plurality of second network units 105. The second network units 105 are adapted to consume power in the communications network 100. The respective reports comprise information indicating workload of the one or more of the plurality of second network units 105 in the communications network 100. The information indicating workload may comprise information indicating at least one of memory capacity of the one or more of the plurality of second network units 105 and computing resources of the one or more of the plurality of second network units 105 and a duration of sleep state of the one or more of the plurality of second network units 105 and quality of service associated with the one or more of the plurality of second network units 105.

In some embodiments, the receiver 1001 is further adapted to receive a sleep response from the at least one of the one or more of the plurality of second network units 105. The response comprises information indicating that the state has been changed from awake to sleep. In some embodiments, the receiver 1001 is further adapted to receive a wakeup response from the at least one of the one or more of the plurality of second network units 105 comprising information indicating that it has changed the state from sleep to awake. The report may be received as a response to the workload request. The workload report may be received regularly.

The first network unit 101 comprises a transmitter 1003 which is adapted to transmit a sleep request to at least one of the one or more of the plurality of second network units 105 to change the state from awake to sleep when one or more of the plurality of second network units 105 are in an awake state and when the workload is below a threshold. The sleep request may comprise information indicating a time at which the change of state shall occur and a duration of the sleep state. The sleep request may comprise information indicating that the at least one of the one or more of the second network units 105 should handle the sleep request with a low priority. In some embodiments, the sleep request is transmitted to the at least one of the one or more of the plurality of second network units 105 taking into account a future incoming workload to the one or more of the plurality of second network units 105. The future incoming workload may be a sudden future incoming workload.

The transmitter 1003 is further adapted to transmit a wakeup request to at least one of the one or more of the plurality of second network units 105 to change the state from sleep to awake when the one or more of the plurality of second network units 105 are in the sleep state and when the workload has reached or is above the threshold. In some embodiments, the transmitter 1003 is further adapted to transmit a workload request to one or more of the plurality of second network units 105. The wakeup request may comprise information indicating that the at least one of the one or more of the second network units 105 should handle the wakeup request with a high priority.

In some embodiments, the first network unit 101 further comprises a setup unit 1005 adapted to set up a connection between the first network unit 101 and each of the plurality of second network units 105.

The first network unit 101 may further comprise a memory 1010 comprising one or more memory units. The memory 1010 is arranged to be used to store data, received data streams, power level measurements, reports, requests and responses, information indicating states, workload information, threshold values, time periods, configurations, schedulings, and applications to perform the methods herein when being executed in the first network unit 101.

Those skilled in the art will also appreciate that the receiver 1001, the transmitter 1003 and the setup unit 1005 described above may refer to a combination of analog and digital circuits, and/or one or more processors configured with software and/or firmware, e.g. stored in the memory 1010, that when executed by the one or more processors such as the processor 1015 perform as described below.

Figure 11:
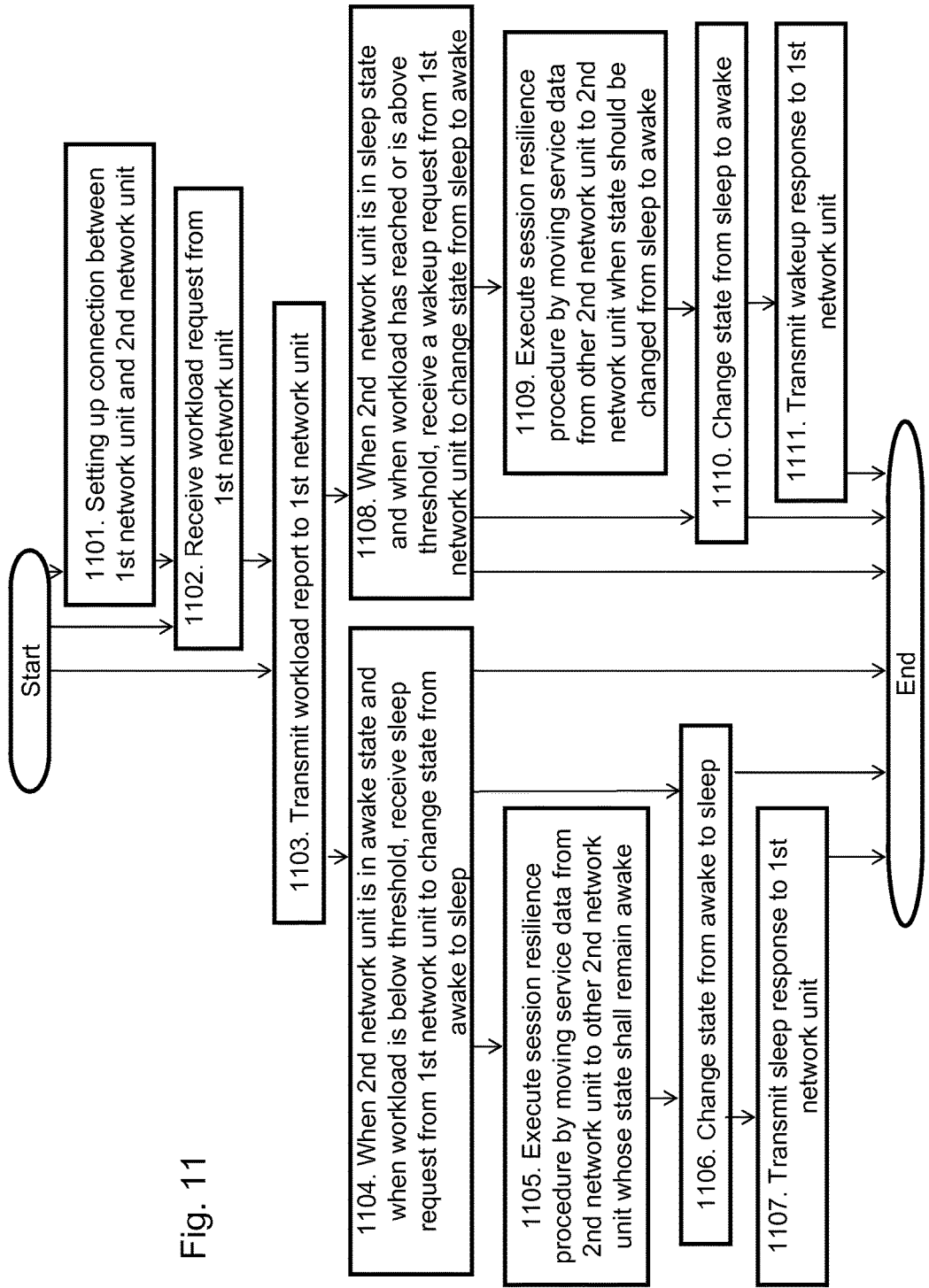
FIG. 11 is a flow chart illustrating embodiments of a method in a second network unit.

The method described above will now be described seen from the perspective of the second network unit 105. FIG. 11 is a flowchart describing the present method in the second network unit 105 for handling states in the communications network 100. The second network unit 105 consumes power in the communications network 100. In some embodiments, the first network unit 101 and the second network units 105 are co-located in one network node. In some embodiments, the first network unit 101 is located in one network node and the second network unit 105 is located in another network node. In some embodiments, the second network unit 105 is a virtual machine in a virtualized environment. The method comprises the following steps performed by the second network unit 105, which steps may be performed in any suitable order than described below:

Step 1101

This step corresponds to steps 502, 503, 506 and 507 in FIG. 5. In some embodiments, the second network unit 105 sets up a connection between the first network unit 101 and the second network unit 105.

Step 1102

This step corresponds to step 602 in FIG. 6. In some embodiments, the second network unit 105 receives a workload request from the first network unit 101

Step 1103

This step corresponds to step 603 in FIG. 6. The second network unit 105 transmits a report to the first network unit 101. As mentioned above, the first network unit 101 is adapted to supervise power in the communications network 101. The report comprises information indicating workload of the second network unit 105. The report may also be referred to as a workload report. The report may be transmitted as a response to the workload request in step 1102. The report may be transmitted regularly.

The information indicating workload may comprise information indicating at least one of memory capacity of the second network unit 105 and computing resources of the second network unit 105 and a duration of sleep state of the second network unit 105 and quality of service associated with the second network unit 105.

Step 1104

This step corresponds to step 702 in FIG. 7. When the second network unit 105 is in an awake state and when the workload is below a threshold, the second network unit 105 receives a sleep request from the first network unit 101 to change the state from awake to sleep. The sleep request may comprise information indicating that the second network unit 105 should handle the sleep request with a low priority. The sleep request may comprise information indicating a time at which the change of state shall occur and a duration of the sleep state.

Step 1105

This step corresponds to step 703 in FIG. 7. In some embodiments, when the state should be changed from awake to sleep, the second network unit 105 executes a session resilience procedure by moving service data from the second network unit 105 to at least one other second network unit in the communications network 100 whose state shall remain awake.

Step 1106

The second network unit 105 changes the state from awake to sleep based on the sleep request in step 1104.

Step 1107

This step corresponds to step 704 in FIG. 7. In some embodiments, the second network unit 105 transmits a sleep response to the first network unit 101. The sleep response may comprise information indicating that the state has been changed from awake to sleep.

Step 1108

This step corresponds to step 802. When the second network unit 105 is in the sleep state and when the workload has reached or is above the threshold, the second network unit 105 receives a wakeup request from the first network unit 101 to change the state from sleep to awake. The wakeup request may comprise information indicating that the second network unit 105 should handle the wakeup request with a high priority.

Step 1109

This step corresponds to step 803 in FIG. 8. In some embodiments, the second network unit 105 executes the session resilience procedure by moving the service data from the at least one other second network unit 105 to the second network unit 105 when the state should be changed from sleep to awake.

Step 1110

The second network unit 105 changes the state from sleep to awake based on the wakeup request.

Step 1111

This step corresponds to step 804 in FIG. 8. In some embodiments, the second network unit 105 transmits a wakeup response to the first network unit 101 comprising information indicating that the second network unit 105 has changed the state from sleep to awake.

Figure 12:
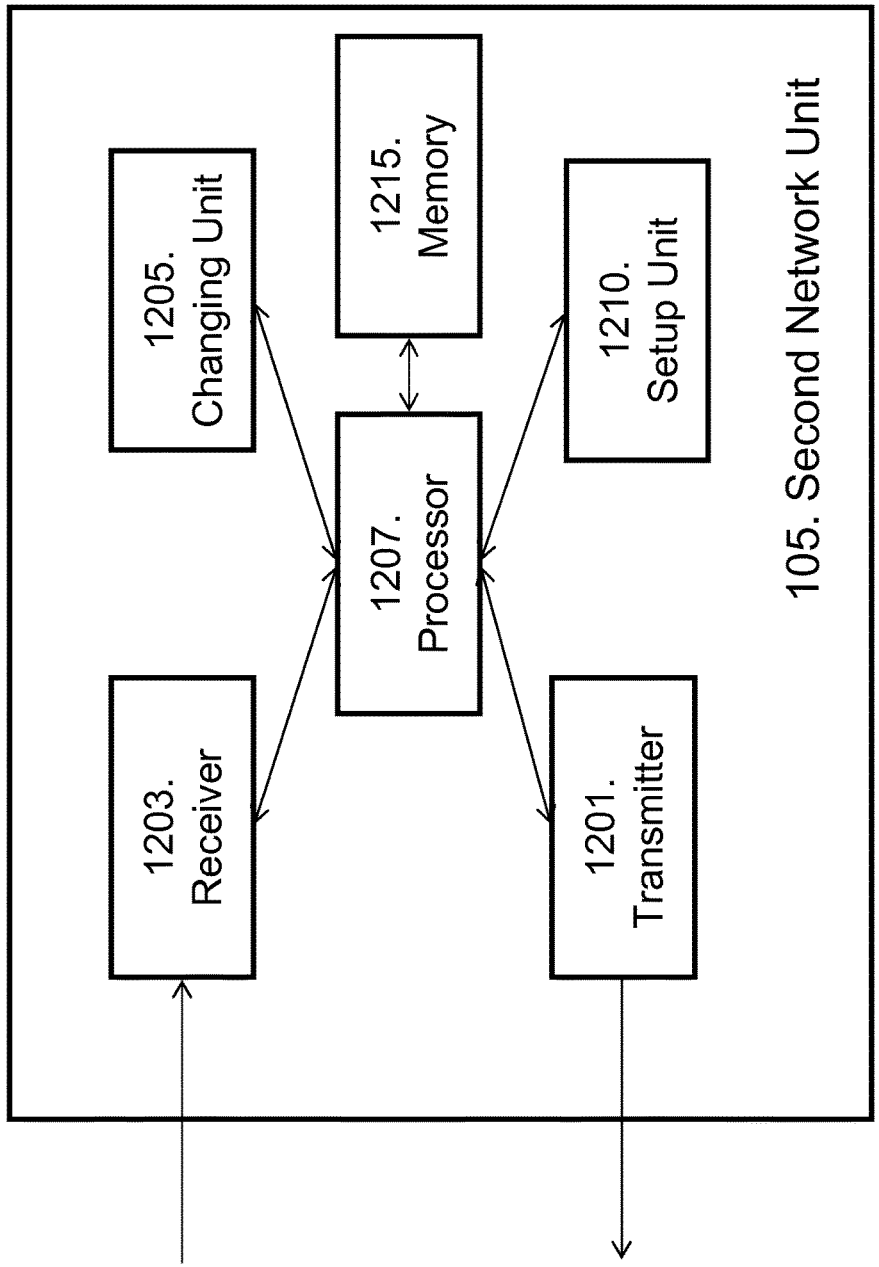
FIG. 12 is a schematic block diagram illustrating embodiments of the second network unit.

To perform the method steps shown in FIG. 11 the second network unit 105 comprises an arrangement as shown in FIG. 12. The second network unit 105 is adapted to consume power in the communications network 100. In some embodiments, the first network unit 101 and the second network units 105 are co-located in one network node. In some embodiments, the first network unit 101 is located in one network node and the second network unit 105 is located in another network node. In some embodiments, the second network unit 105 is a virtual machine in a virtualized environment.

The second network unit 105 comprises a transmitter 1201 which is adapted to transmit a report to the first network unit 101. As mentioned above, the first network unit 101 is adapted to supervise power in the communications network 100. The report comprises information indicating workload of the second network unit 105. In some embodiments, the report is transmitted as a response to a workload request. In some embodiments, the report is transmitted regularly to the first network unit 101. The information indicating workload may comprise information indicating at least one of memory capacity of the second network unit 105 and computing resources of the second network unit 105 and a duration of sleep state of the second network unit 105 and quality of service associated with the second network unit 105.

In some embodiments, the transmitter 1201 is further adapted to transmit a wakeup response to the first network unit 101 comprising information indicating that the second network unit 105 has changed the state from sleep to awake. In some embodiments, the transmitter 1201 is further adapted to transmit a sleep response to the first network unit 101. The response may comprise information indicating that the state has been changed from awake to sleep.

The second network unit 105 comprises a receiver 1203 adapted to receive a sleep request from the first network unit 101 to change the state from awake to sleep when the second network unit 105 is in an awake state and when the workload is below a threshold. The sleep request may comprise information indicating that the second network unit 105 should handle the sleep request with a low priority. In some embodiments, the sleep request comprises information indicating a time at which the change of state shall occur and a duration of the sleep state.

The receiver 1203 is further adapted to receive a wakeup request from the first network unit 101 to change the state from sleep to awake when the second network unit 105 is in the sleep state and when the workload has reached or is above the threshold. In some embodiments, the receiver 1203 is further adapted to receive a workload request from the first network unit 101. The wakeup request may comprise information indicating that the second network unit 105 should handle the wakeup request with a high priority.

The second network unit 105 comprises a changing unit 1205 adapted to change the state from awake to sleep based on the sleep request. The changing unit 1205 is further adapted to change the state from sleep to awake based on the wakeup request.

The second network unit 105 may further comprise a processor 1207 which is adapted to execute a session resilience procedure by moving service data from the second network unit 105 to at least one other second network unit in the communications network 100 whose state shall remain awake. The session resilience procedure is performed when the state should be changed from awake to sleep. The processor 1207 may be further adapted to execute the session resilience procedure by moving the service data from the at least one other second network unit 105 to the second network unit 105 when the state should be changed from sleep to awake.

In some embodiments, the second network unit further comprises a setup unit 1210 adapted to set up a connection between the first network unit 101 and the second network unit 105.

The second network unit 105 may further comprise a memory 1215 comprising one or more memory units. The memory 1215 is arranged to be used to store data, received data streams, power level measurements, reports, requests and responses, information indicating states, workload information, threshold values, time periods, configurations, schedulings, and applications to perform the methods herein when being executed in the second network unit 105.

Those skilled in the art will also appreciate that the transmitter 1201, the receiver 1203, the changing unit 1205 and the setup unit 1210 described above may refer to a combination of analog and digital circuits, and/or one or more processors configured with software and/or firmware, e.g. stored in the memory 1215, that when executed by the one or more processors such as the processor 1207 perform as described above.

The present mechanism for handling states in a communications network 100 may be implemented through one or more processors, such as a processor 1015 in the first network unit 101 depicted in FIG. 10 and the processor 1207 in the second network unit 105 depicted in FIG. 12, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the first network unit 101 and/or second network unit 105. One such carrier may be in the form of a Compact Disc Read Only Memory (CD ROM) disc. It is however feasible with other data carriers such as a memory stick. The computer program code can furthermore be provided as pure program code on a server and downloaded to the first network unit 101 and/or second network unit 105.

The embodiments herein are not limited to the above described embodiments. Various alternatives, modifications and equivalents may be used. Therefore, the above embodiments should not be taken as limiting the scope of the embodiments, which is defined by the appending claims.

The term "adapted to" used herein may also be referred to as "arranged to" or "configured to".

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in a first network unit for handling states in a communications network, which first network unit is configured to supervise power in the communications network, the method comprising:
   receiving a first report transmitted by a second network unit that consumes power in the communications network, wherein the first report comprises information indicating a first workload of the second network unit;
   receiving a second report transmitted by a third network unit that consumes power in the communications network, wherein the second report comprises information indicating a second workload of the third network unit;
   determining, based on at least the received first report transmitted by the second network unit, whether the second network unit is in an awake state and the first workload is below a threshold;
   as a result of determining, based on at least the received first report transmitted by the second network unit, that the second network unit is in the awake state and the first workload is below the threshold, transmitting a sleep request to the second network unit to change the state of the second network unit from the awake state to a sleep state;
   determining, based on at least the received second report transmitted by the third network unit, whether the third network unit is in the sleep state and the second workload is above the threshold; and
   as a result of determining, based on at least the received second report transmitted by the third network unit, that the third network unit is in the sleep state and the second workload has reached or is above the threshold, transmitting a wakeup request to the third network unit to change the state of the third network unit from the sleep state to the awake state,
   wherein the information indicating the first workload comprises information indicating: i) at least memory capacity of the second network unit, ii) at least computing resources of the second network unit, iii) at least a duration of the sleep state of the second network unit, or iv) at least quality of service associated with the second network unit, and
   wherein the information indicating the second workload comprises information indicating: i) at least memory capacity of the third network unit, ii) at least computing resources of the third network unit, iii) at least a duration of the sleep state of the third network unit, or iv) at least quality of service associated with the third network unit.

2. The method of claim 1, further comprising:
receiving a sleep response from the second network unit, wherein the sleep response comprises information indicating that the state of the second network unit has been changed from the awake state to the sleep state.

3. The method of claim 1, further comprising
receiving a wakeup response from the third network unit, wherein the wakeup response comprises information indicating that the state of the third network unit has been changed from the sleep state to the awake state.

4. The method of claim 1, further comprising:
transmitting a first workload request to the second network unit, wherein the first report is received as a response to the first workload request; and
transmitting a second workload request to the third network unit, wherein the second report is received as a response to the second workload request.

5. The method of claim 1, further comprising:
setting up a connection between the first network unit and one or more of the second network unit and the third network unit.

6. The method of claim 1, wherein the first report is received regularly, and wherein the second report is received regularly.

7. The method of claim 1, wherein the sleep request comprises information indicating a time at which the change of state of the second network unit shall occur and a duration of the sleep state.

8. The method of claim 1, wherein the sleep request comprises information indicating that the second network unit should handle the sleep request with a low priority.

9. The method of claim 1, wherein the wakeup request comprises information indicating that the third network unit should handle the wakeup request with a high priority.

10. The method of claim 1, wherein the sleep request is transmitted to the second network unit taking into account a future incoming workload to the second network unit.

11. The method of claim 1, wherein the first network unit, the second network unit, and the third network unit are co-located in one network node.

12. The method of claim 1, wherein the first network unit is located in a first network node, wherein the second network unit is located in a second network node, and wherein the third network unit is located in a third network node.

13. The method of claim 1, wherein the second network unit and the third network unit are virtual machines in a virtualized environment.

14. A first network unit for handling states in a communications network, wherein the first network unit is configured to supervise power in the communications network, the first network unit comprising:
a receiver;
a transmitter; and
a data processing system coupled to the receiver and the transmitter, the data processing system configured to:
employ the receiver to receive a first report from a second network unit that consumes power in the communications network, wherein the first report comprises information indicating a first workload of the second network unit,
employ the receiver to receive a second report from a third network unit that consumes power in the communications network, wherein the second report comprises information indicating a second workload of the third network unit,
determine, based on at least the received first report, whether the second network unit is in an awake state and the first workload is below a threshold,
as a result of determining, based on at least the received first report, that the second network unit is in the awake state and the first workload is below the threshold, employ the transmitter to transmit a sleep request to the second network unit to change the state of the second network unit from the awake state to a sleep state,
determine, based on at least the received second report, whether the third network unit is in the sleep state and the second workload is above the threshold, and
as a result of determining, based on at least the received second report, that the third network unit is in the sleep state and the second workload has reached or is above the threshold, employ the transmitter to transmit a wakeup request to the third network unit to change the state of the third network unit from the sleep state to the awake state,
wherein the information indicating the first workload comprises information indicating: i) at least memory capacity of the second network unit, ii) at least computing resources of the second network unit, iii) at least a duration of the sleep state of the second network unit, or iv) at least quality of service associated with the second network unit, and
wherein the information indicating the second workload comprises information indicating: i) at least memory capacity of the third network unit, ii) at least computing resources of the third network unit, iii) at least a duration of the sleep state of the third network unit, or iv) at least quality of service associated with the third network unit.

15. The first network unit according to claim 14, wherein the data processing system is further configured to employ the receiver to receive a sleep response from the second network unit, wherein the sleep response comprises information indicating that the state of the second network unit has been changed from the awake state to the sleep state.

16. The first network unit of claim 14, wherein the data processing system is further configured to employ the receiver to receive a wakeup response from the third network unit, wherein the wakeup response comprises information indicating that the state of the third network unit has been changed from the sleep state to the awake state.

17. The first network unit of claim 14, wherein the data processing system is further configured to:
employ the transmitter to transmit a first workload request to the second network unit, wherein the first report is received as a response to the first workload request; and
employ the transmitter to transmit a second workload request to the third network unit, wherein the second report is received as a response to the second workload request.

18. The first network unit of claim 14,
wherein the data processing system is further configured to set up a connection between the first network unit and one or more of the second network unit and the third network unit.

19. The first network unit of claim 14, wherein the first report is received regularly, and wherein the second report is received regularly.

20. The first network unit of claim 14, wherein the sleep request comprises information indicating a time at which the change of state of the second network unit shall occur and a duration of the sleep state.

21. The first network unit of claim 14, wherein the sleep request comprises information indicating that the second network unit should handle the sleep request with a low priority.

22. The first network unit of claim 14, wherein the wakeup request comprising information indicating that the third network unit should handle the wakeup request with a high priority.

23. The first network unit of claim 14, wherein the sleep request is transmitted to the second network unit taking into account a future incoming workload to the second network unit.

24. The first network unit of claim 14, wherein the first network unit, the second network unit, and the third network unit are co-located in one network node.

25. The first network unit of claim 14, wherein the first network unit is located in a first network node, wherein the second network unit is located in a second network node, and wherein the third network unit is located in a third network node.

26. The first network unit of claim 14, wherein the second network unit and the third network unit are virtual machines in a virtualized environment.

* * * * *